(12) United States Patent
Meng et al.

(10) Patent No.: US 10,502,620 B1
(45) Date of Patent: Dec. 10, 2019

(54) SPECTRUM DETECTION APPARATUS (71) Applicant: BOE TECHNOLOGY GROUP CO., LTD., Beijing (CN)

(72) Inventors: Xianqin Meng, Beijing (CN); Wei Wang, Beijing (CN); Fangzhou Wang, Beijing (CN); Xiandong Meng, Beijing (CN); Jifeng Tan, Beijing (CN); Xiaochuan Chen, Beijing (CN); Jian Gao, Beijing (CN); Qiuyu Ling, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/407,101

(22) Filed: May 8, 2019

(30) Foreign Application Priority Data

Jul. 27, 2018 (CN) ...................... 2018 2 1207044 U (51) Int. Cl.
*G01J 3/28* (2006.01)
*G01J 3/02* (2006.01)
*G01J 3/18* (2006.01)
*G02B 27/42* (2006.01)

(52) U.S. Cl.
CPC ............... *G01J 3/0205* (2013.01); *G01J 3/18* (2013.01); *G02B 27/4244* (2013.01)

(58) Field of Classification Search
CPC .... G01J 3/02; G01J 3/0205; G01J 3/18; G01J 3/28; G01J 3/26; G02B 27/42; G02B 5/28; G02B 5/18; G01N 21/27; G01N 21/26
See application file for complete search history.

(56) References Cited

U.S. PATENT DOCUMENTS 6,331,276 B1 * 12/2001 Takei ................... G01N 21/554
422/82.09

* cited by examiner

*Primary Examiner* — Abdullahi Nur
(74) *Attorney, Agent, or Firm* — Kinney & Lange, P.A.

(57) ABSTRACT

A spectrum detection apparatus is disclosed, including at least one spectrum detection unit. Each spectrum detection unit includes a light source and an optical substrate, including an optical medium layer, the optical medium layer includes a first surface and a second surface opposite to the first surface, and the first surface is closer to the light source than the second surface. The optical substrate further includes a light inlet, a first light-shielding layer, a grating and a light outlet sequentially arranged on the first surface and in an extension direction of the optical medium layer, the first light-shielding layer is configured to reflect target light and absorb non-target light, and the grating is configured to perform diffractive dispersion on the target light. Each spectrum detection unit further includes a micro-fluid substrate and a sensor substrate including a photosensitive sensor configured to detect light from the micro-fluid substrate.

20 Claims, 5 Drawing Sheets

SPECTRUM DETECTION APPARATUS

CROSS-REFERENCE TO RELATED APPLICATION

This application claims a priority to Chinese Patent Application No. 201821207044.1 filed on Jul. 27, 2018, the disclosure of which is incorporated in its entirety by reference herein.

TECHNICAL FIELD

The present disclosure relates to the field of detection instrument, and in particular to a spectrum detection apparatus.

BACKGROUND

Depending on the principles of spectrum splitting, spectrum splitting systems can be divided into two types: dispersion-type and modulation-type. A dispersion-type spectrum splitting system includes a prism, a grating, an interferometer, and a modulation-type spectrum splitting system includes a Fourier transform spectrometer. The commonly used spectrum splitting systems are prismatic spectrum splitting systems or grating spectrum splitting systems. A prismatic spectrum splitting system has low dispersion and poor spectrum splitting performance, and a prismatic spectrum splitting system or a grating-prism dispersive spectrum splitting system also has such disadvantages. In order to achieve high dispersion and good spectral performance, a grating spectrum splitting system is generally used, which also has the advantages of wide spectral measurement range and high resolution.

SUMMARY

A spectrum detection apparatus is provided according to embodiments of the present disclosure. The apparatus includes at least one spectrum detection unit, and each of the at least one spectrum detection unit includes:

a light source, configured to emit light;

an optical substrate, including an optical medium layer, where the optical medium layer includes a first surface and a second surface opposite to the first surface, the first surface is closer to the light source than the second surface, and a refractive index of the optical medium layer is higher than 1, where the optical substrate further includes a light inlet, a first light-shielding layer, a grating and a light outlet sequentially arranged on the first surface and in an extension direction of the optical medium layer, the light inlet is arranged corresponding to the light source and is configured to guide the light emitted by the light source into the optical medium layer under the light inlet, the first light-shielding layer is configured to reflect target light and absorb non-target light, and the grating is configured to perform diffractive dispersion on the target light;

a micro-fluid substrate, arranged on a side of the optical substrate proximate to the light source and including at least one micro-fluid channel configured to accommodate a micro-fluid, where the light outlet is configured to guide light dispersed by the grating and thereafter reflected by the second surface into the at least one micro-fluid channel; and a sensor substrate, arranged at a side of the micro-fluid substrate facing away from the optical substrate, and including at least one photosensitive sensor that is configured to detect light exiting from the at least one micro-fluid channel.

In some optional embodiments, the first light-shielding layer includes a plurality of first light-absorbing sheets and a plurality of first medium layers that are arranged alternately in the extension direction of the optical medium layer. Each of the first light-absorbing sheets is configured to absorb light with a non-target incident angle, and a refractive index of the first medium layer is lower than the refractive index of the optical medium layer, whereby light with a target angle is totally reflected by an interface between the first medium layer and the optical medium layer.

In some optional embodiments, a length of each light-absorbing sheet is $2*\tan \alpha * H - L$, where $\alpha$ is a principal incident angle of the light emitted by the light source and is greater than an angle of total reflection, H is a thickness of the optical medium layer, and L is a width of the light inlet.

In some optional embodiments, a length of each first medium layer is smaller than or equal to the width L of the light inlet.

In some optional embodiments, the principal incident angle $\alpha$ is selected from angles between a critical angle of the optical medium layer to air and 60 degrees.

In some optional embodiments, each spectrum detection unit includes a plurality of gratings; or grating constants of gratings in different spectrum detection units are different, and gratings in different spectrum detection units are configured to perform diffractive dispersion on light in different wavebands, respectively.

In some optional embodiments, the at least one photosensitive sensor is arranged corresponding to the light outlet.

In some optional embodiments, a second light-shielding layer is provided on the second surface of the optical medium layer, and the second light-shielding layer includes a plurality of second light-absorbing sheets and a plurality of second medium layers that are arranged alternately in an extension direction of the optical medium layer. A length of each second light-absorbing sheet is equal to the length of the first light-absorbing sheet, a length of each second medium layer is equal to a length of the first medium layer, and each of the first light-absorbing sheets and the corresponding first light-absorbing sheet are misaligned with each other by a first distance in a direction from the light inlet to the light outlet, whereby light reflected by each second medium layer is incident on the corresponding first medium layer.

In some optional embodiments, the optical substrate further includes a plurality of third light-absorbing sheets arranged on the first surface and configured to absorb the dispersed light that is not guided into the light outlet. Part of the third light-shielding sheets is located between the grating and the light outlet, another part of the third light-shielding sheets is located at a side of the light outlet away from the grating.

In some optional embodiments, the optical medium layer is made of at least one of glass, a resin, a polyester compound or paper.

In some optional embodiments, the micro-fluid substrate further includes: a reaction cell connected with one end of the at least one micro-fluid channel; and a waste reservoir connected with the other end of the at least one micro-fluid channel.

In some optional embodiments, each reaction cell is connected with at least one micro-fluid channel.

In some optional embodiments, the first light-absorbing sheet includes a black photoresist resin thin film or a metal thin film, and the first medium layer is an air layer.

In some optional embodiments, the second light-absorbing sheet includes a black photoresist resin thin film or a metal thin film, and the second medium layer is an air layer.

In some optional embodiments, the at least one micro-fluid channel is formed by spin-coating photoresist on the optical substrate and exposing the photoresist as spin-coated.

In some optional embodiments, the light source is a micro light-emitting diode.

In some optional embodiments, the at least one photo-sensitive sensor is integrated into the sensor substrate by using a transparent electrode.

In some optional embodiments, a hydrophobic film layer or a hydrophilic film layer is applied on an inner surface of each micro-fluid channel, whereby the micro-fluid flows at a predetermined velocity or holds still for a short time in the micro-fluid channel.

In some optional embodiments, the first light-absorbing sheet is further configured to absorb light with a non-target wavelength, and the optical substrate, the micro-fluid substrate and the sensor substrate are stacked in sequence.

In some optional embodiments, the first distance is a half of the sum of the lengths of the first light-absorbing sheet and the first medium layer.

BRIEF DESCRIPTION OF THE DRAWINGS

In order to more clearly describe the technical solutions of the present disclosure, the drawings involved in description of the embodiments according to the present disclosure are briefly introduced. Apparently, the drawings only illustrate some embodiments of the present disclosure, and other drawings may be obtained by those skilled in the art based on the appended drawings without any inventive efforts.

DETAILED DESCRIPTION

Implementation of the present disclosure is further described in conjunction with the drawings and embodiments hereinafter. The embodiments are merely for purpose of description and do not limit the present disclosure in any form.

Figure 1:
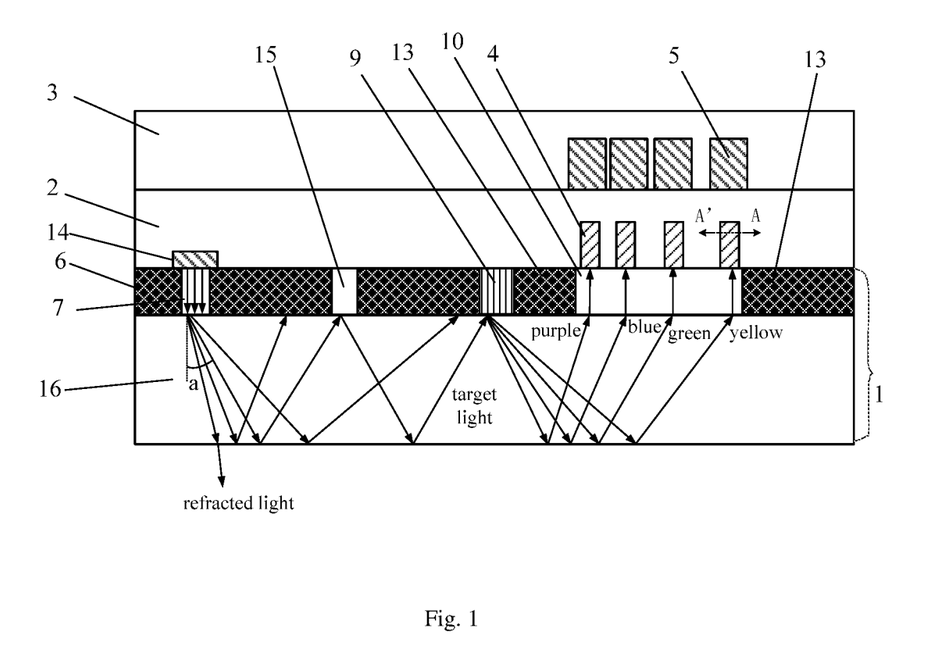
FIG. 1 is a schematic diagram of a spectrum detection apparatus according to an embodiment of the present disclosure.

A spectrometer in related art, which includes a spectrum splitting system, has a complex structure and is thus difficult to manufacture. In view of this, a spectrum detection apparatus is provided according to an embodiment of the present disclosure. As shown in FIG. 1, the spectrum detection apparatus includes at least one light source 14 configured to emit light, an optical substrate 1, a micro-fluid substrate 2 and a sensor substrate 3, and the optical substrate 1, the micro-fluid substrate 2 and the sensor substrate 3 are stacked in sequence.

The optical substrate 1 includes an optical medium layer 16, and the optical medium layer 16 includes a first surface and a second surface opposite to the first surface, where the first surface is closer to the light source 14 than the second surface.

The optical substrate 1 further includes a light inlet 7, a first light-shielding layer, a grating 9 and a light outlet 10 that are sequentially arranged on the first surface and in an extension direction of the optical medium layer 16. The light inlet 7 is arranged corresponding to the light source 14 and is configured to guide the light emitted by the light source 14 into the optical medium layer 16 under the light inlet 7. The first light-shielding layer is configured to reflect target light and absorb non-target light both from the light emitted by the light source 14 and reflected by the second surface of the optical medium layer 16, and the grating 9 is configured to perform diffractive dispersion on the target light.

The micro-fluid substrate 2 is arranged on a side of the optical substrate 1 close to the light source 14, and includes at least one micro-fluid channel 4, which is configured to accommodate a micro-fluid and receive emergent light from the light outlet 10.

The sensor substrate 3 is arranged at a side of the micro-fluid substrate 2 facing away from the optical substrate 1 and includes at least one photosensitive sensor 5, which is configured to detect light exiting from the at least one micro-fluid channel 4.

In some optional embodiments, the first light-shielding layer includes multiple first light-absorbing sheets 6 and multiple first medium layers 15 which are arranged alternately in the extension direction of the first surface, and each of the first light-absorbing layers 6 is configured to absorb light with non-target wavelengths and light with non-target angles.

The grating 9 performs diffractive dispersion on light in a waveband, where dispersed light with different wavelengths have different diffraction angles. The dispersed light is reflected by the second surface of the optical medium layer 16. The reflected dispersed light propagates to the light outlet 10, enters the micro-fluid substrate 2 and is thereafter detected by the sensor substrate 3. Multiple photosensitive sensors 5 corresponding to the light with different wavelengths at the light outlet 10 may be provided on the sensor substrate 3. The micro-fluid channel 4 on the micro-fluid substrate 2 is arranged between the light outlet 10 and the photosensitive sensor 5, and each micro-fluid channel 4 is arranged corresponding to one photosensitive sensor 5.

In some optional embodiments, the light source is arranged at the light inlet 7, and the light emitted by the light source may directly enter the optical substrate 1 through the light inlet 7.

The light enters the optical medium layer 16 of the optical substrate 1 through the light inlet 7, and is reflected by the second surface of the optical substrate 1. The first light-shielding layer absorbs the reflected light except the target light, i.e., the first light-shielding layer absorbs non-target light and reflects the target light. The target light propagates to the grating 9 and is diffracted, so as to disperse the target light. The dispersed light transmits out of the optical substrate 1 through the light outlet 10 on the first surface after being reflected by the second surface of the optical substrate 1. The photosensitive sensor 5 detects a spectrum of the emergent light from the micro-fluid channel 4, and performance parameters of the micro-fluid may be determined based on the detected spectrum.

The spectrum detection apparatus according to the above embodiments of the present disclosure has a simple structure and a low manufacture difficulty. The light inlet 7, the first light-shielding layer, the grating 9 and the light outlet 10 on the first surface of the optical substrate 1 can achieve selection and dispersion on the light emitted by the light source, and the selected and dispersed light transmits out of the optical substrate 1 through the light outlet 10, so that precise spectroscopic color separation can be achieved by the optical substrate 1. The light emergent from the light outlet 10 passes through the at least one micro-fluid channel 4, and the photosensitive sensor 5 receives light which passes through each micro-fluid channel 4, where different micro-fluids have different transmittance, absorption and dispersion properties on the light. The photosensitive sensor 5 detects spectral response properties of the micro-fluid in the micro-fluid channel 4 by detecting the light emergent from the micro-fluid channel 4.

The spectrum detection apparatus according to the present disclosure may function as a micro spectrometer, which can be applied in fields of physics, biology and chemistry. Spectrum analysis, substance testing and calibration, molecular diagnosis, food quarantine and bacteria classification can be performed with the spectrum detection apparatus according to the present disclosure.

In some optional embodiments, the light source may be made of a monochromatic semiconductor laser chip or an LED chip with good collimation, and the type of the light source is not limited in the present disclosure. Preferably, the light source is a Micro-LED chip, which readily matches the light inlet, facilitates obtaining of collimated light and has a low cost.

In some optional embodiments, the optical medium layer 16 in the optical substrate 1 may be a glass substrate, which has a low cost and is in condition for mass production. A thickness of the glass substrate may be 2 mm. The optical medium layer 16 in the optical substrate 1 may be made of a resin or a polyester compound with desirable stability, or other materials such as paper, where a thickness thereof may be designed on practical demands.

The grating 9 on the first surface of the optical substrate 1 can perform diffractive dispersion on light, thereby splitting the light by wavelength. A period of the grating 9 is determined based on a wavelength of emergent light, a refractive index of an emergent medium, a refractive index of an incident medium, an incident angle and a light emergent direction. A duty ratio of the grating may be 0.5, which, notwithstanding, may be other values in practical product designing for purposes such as adjusting intensity of emergent light and equilibrating brightness at different locations of a display panel. A height of the grating 9 is determined based on intensity of light with a certain wavelength or several wavelengths, which may be several hundred nanometers or in micrometer scale. In a case that other light filter structures are provided, a micro reflector or other micro structures may be provided therein according to requirements of special wavelengths and emergent angles of filtered light.

In some optional embodiments, the micro-fluid substrate 2 is made of silicon, glass and a polymer. The polymer is polydimethylsiloxane (PDMS) or polymethyl methacrylate (PMMA). The micro-fluid channel 4 is formed by applying photoresist on the optical substrate 1 by rotation and exposing the applied photoresist. For example, the micro-fluid channel 4 can be formed on the optical substrate by applying a photoresist layer on the optical substrate 1, stacking a mask layer on the photoresist layer, exposing the mask layer and the photoresist layer, removing the mask layer and developing the photoresist layer. In addition, the micro-fluid channel 4 may be formed by photoetching and etching after the photoetching. A width and a height of the micro-fluid channel 4 may be in nanoscale. A hydrophobic or a hydrophilic film layer may be coated on an inner surface of the micro-fluid channel 4 as required in practical application, so that the micro-fluid can flow at a predetermined velocity or hold still for a short time in the micro-fluid channel 4. For example, a Teflon amorphous fluoroplastics (Teflon AF) hydrophobic layer may be coated thereon, so as to enable the micro-fluid to flow in the micro-fluid channel 4 with least adherence.

Figure 2:
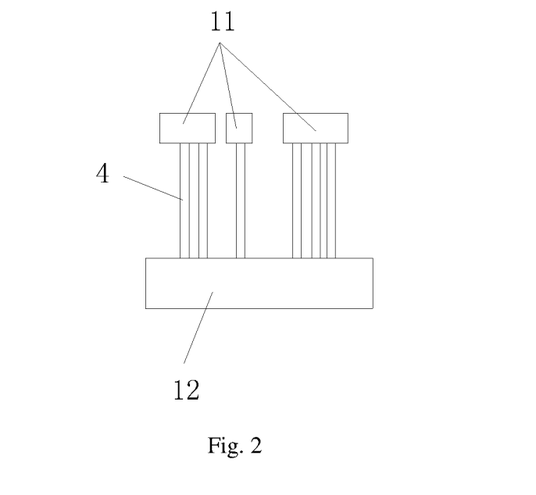
FIG. 2 is a cross sectional view of a micro-fluid substrate taken along a line A-A' of FIG. 1 according to an embodiment of the present disclosure.

In some optional embodiments, as shown in FIG. 2, the micro-fluid substrate 2 further includes a reaction cell 11 and a waste reservoir 12. The reaction cell 11 is connected with one end of the micro-fluid channel 4, and the waste reservoir 12 is connected with the other end of the micro-fluid channel 4. Substances react with each other in the reaction cell 11, and a micro-fluid generated by the reaction flows into the waste reservoir 12. The emergent light from the light outlet 10 propagates through the micro-fluid channel 4 and is then captured by the photosensitive sensor 5, thereby detecting the micro-fluid in the micro-fluid channel 4. Multiple reaction cells 11 may be provided, and each reaction cell 11 is connected with at least one micro-fluid channel 4, thereby detecting spectral properties of each of multiple micro-fluids generated by the reaction. The reaction cell 11 and the waste reservoir 12 are formed by the same method as the micro-fluid channel 4.

In some optional embodiments, the photosensitive sensor 5 is integrated into the sensor substrate 3 by a transparent electrode, where the sensor substrate 3 may be a glass substrate. The transparent electrode may be, for example, made of indium tin oxide (ITO) or zinc oxide (ZnO) doped with aluminum (Al). A distance between two adjacent photosensitive sensors 5 depends on requirements of precision of a direction of emergent light from a light coupling structure (or array), and signal to noise ratios of the photosensitive sensors 5. Preferably, the two adjacent photosensitive sensors 5 are arranged in tight contact with each other. A buffer film layer may be provided between the two adjacent photosensitive sensors 5. The photosensitive sensor 5 may include any one or more of a charge coupled device (CCD), a complementary metal oxide semiconductor (CMOS) or a PIN-type photodiode.

In some optional embodiments, a first light-absorbing sheet for absorbing reflected light of light incident on and reflected by the second surface except target light is provided on the first surface of the optical substrate 1. A thickness of the first light-absorbing sheet is intended for absorbing light with non-target wavelengths. For example, the thickness of the first light-absorbing sheet may range from 0.9 µm to 1.1 µm. Optionally, the thickness of the first light-absorbing sheet is 1.0 µm, and the first light-absorbing sheet is a black matrix made of a black photoresist resin thin film or a metal thin film, where the metal thin film may be made of chromium (Cr) or chromium oxide ($CrO_3$), for example.

Optionally, the first medium layer 15 may be a gas, a liquid or a solid layer with a refractive index lower than a refractive index of the first optical medium layer 16, which is not limited in the present disclosure. Optionally, the first medium layer 15 is an air layer.

With reference to FIG. 1, the first light-shielding layer includes multiple first light-absorbing sheets 6 and multiple first medium layers 15 which are alternately arranged in an extension direction of the first optical medium layer 16, and the first light-shielding layers 6 are configured to absorb light with non-target wavelengths and light with non-target angles. A length of each first light-absorbing sheet 6 is 2*tan α*H−L, where α is a principal incident angle of the light emitted by the light source and is greater than an angle of total reflection, H is a thickness of the optical medium layer 16, and L is a width of the light inlet 7 in a first direction from the light inlet 7 to the light outlet 10. The multiple first light-absorbing sheets 6 can achieve selection of light by absorbing light with non-target angles or light with non-target wavelengths, and light with target angles or target wavelengths (target light) is totally reflected by the first surface where the first medium layer 15 and the optical medium layer 16 contact with each other. The totally reflected target light is further totally reflected by the second surface of the optical medium layer 16, and enters the grating 9.

As shown in FIG. 1, light incident through the light inlet 7 propagates to the second surface of the optical medium layer 16, where light with incident angles smaller than a critical angle of the optical medium layer 16 is refracted to ambient air, and light with incident angles greater than the critical angle of the optical medium layer 16 is totally reflected by the second surface to a first light-absorbing sheet 6 or a first medium layer 15 on the first surface of the optical medium layer 16. Light with incident angles within a range of target angles is incident on the first medium layer 15 on the first surface and is reflected; and light with incident angles in a range of non-target angels is incident on the first light-absorbing sheet 6 and gets absorbed there. Thus, after being reflected by the first surface where the first medium layer 15 and the optical medium layer 16 contact with each other, the target light is incident on the second surface of the optical medium layer 16 again and is totally reflected by the second surface. In such a manner, the target light propagates towards the right one reflection after another, until it enters the grating 9, and is diffracted and dispersed by the grating 9.

Hence, only target light having incident angles within the range of the target angels can be totally reflected by the first medium layer 15 on the first surface and the second surface repeatedly, until it enters the grating 9. The optical medium layer 16 is a waveguide structure, where the target light gets totally reflected by its first surface and its second surface thereof repeatedly. Non-target light having incident angles beyond the range of target angles transmits outside through the second surface or gets absorbed by the first light-absorbing sheet 6, and thus cannot enter the grating 9. In this way, the target light is selected by the optical substrate 1.

In some optional embodiments, in order to select light with the target wavelengths, the second medium layer 6 may be made of a material which absorbs light with certain wavelengths.

In some optional embodiments, as shown in FIG. 1, in order to reduce the number of transmissions of light in the optical substrate 1 and more quickly complete light selection, a second light-shielding layer, which includes multiple second light-absorbing sheets 17 and multiple second medium layers 18 alternately arranged in an extension direction of the second surface, is provided on the second surface of the optical substrate. A length of the second light-absorbing sheet 17 is equal to the length of the first light-absorbing sheet 6, a length of the second medium layer 18 is equal to a length of the first medium layer 15, and the second light-shielding layer and a corresponding first light-shielding layer are misaligned by a half of the sum of lengths of one second light-absorbing sheet 17 and one second medium layer 18 in a direction from the light inlet to the light outlet.

The second light-absorbing sheet 17 is a matrix made of a black photoresist resin thin film or a metal thin film. Multiple second light-absorbing sheets 17 evenly spaced by a second distance between each other are provided, which can absorb light incident on the second light-absorbing sheet 17, thereby eliminating light with non-target angles and achieving quick light selection. For example, after light entering the optical substrate 1 through the light inlet 7 is incident on the second surface, light with non-target angles (for example, light with incident angles smaller than the angle of total reflection) is absorbed by the multiple second light-absorbing sheet 17 to reduce interference. Highly reflective layers are coated on the second medium layers 18 between the multiple second light-absorbing sheet 17, and light incident on the highly reflective layers is reflected to the first surface of the first optical medium layer 16.

In some embodiments, the second medium layer 18 may be a gas layer, a liquid layer, or a solid layer with a refractive index lower than a refractive index of the first optical medium layer 16, which is not limited in the present disclosure. Optionally, the second medium layer 18 is an air layer.

In some embodiments, it is preferred that the light source emits light with highest intensities to the optical substrate 1 with large incident angles, and the principal incident angle α is selected from angles between a critical angle of light passing from the optical medium layer into air and 60 degrees, so that light emitted by a Lambertian source such as a micro light emitting diode can have high intensity and be incident on the second surface with incident angles greater than the angle of total reflection after entering the optical substrate 1. The light source may be arranged at the light inlet 7, and light can be incident on the optical substrate 1 with the principal incident angle α selected from angles between the critical angle of light passing from the optical medium layer into air and 60 degrees by adjusting an orientation angle of the light source.

Structures of the light inlet 7 and the first light-absorbing layer on the first surface of the first optical medium layer 16 are described with reference to an example.

With reference to FIG. 1, the optical medium layer 16 of the optical substrate 1 is a glass substrate, and the light inlet 7 and the first light-absorbing sheet are arranged on a first surface of the glass substrate. The light source is a Micro-LED chip and is arranged at the light inlet 7, and that the first medium sheet is an air layer is taken for example. A length and a width of the Micro-LED chip are both 250 μm, and the length of the Micro-LED chip is the same as the width of the light inlet 7.

The Micro-LED chip emits light in accordance with Lambertian radiation, and a light intensity thereof is expressed as $I=I_0*\cos\theta$, where $I_0$ is a total intensity, and $\theta$ is a radiation angle. According to the formula of Lambertian radiation, 91.7% of the light has radiation angles between 0 degrees and 60 degrees, and 8.3% of the light has radiation angles between 61 degrees and 90 degrees. A critical angle of light passing from the glass substrate into air is expressed as $\theta c=\arcsin(1/1.52)=41°$, where 1.52 is the refractive index of glass, and 1 is the refractive index of the air layer. The light emitted by the Micro-LED chip enters the glass substrate with the principal incident angle α, where the principal incident angle α is selected from angles between the critical angle of light passing from the optical medium layer into air and 60 degrees. Light with incident angles smaller than the critical angle directly transmits out of the glass substrate through a second surface thereof and is thus wasted, to reduce interference, and light with incident angles greater than the critical angle is totally reflected on an interface between the glass substrate and air to the first surface of the glass substrate and thereafter is totally reflected on the first surface and the second surface of the glass substrate alternately. In the process of total reflection, light incident on the multiple first light-absorbing sheets 6 on the first surface is absorbed, and light incident on the spacings between the multiple first light-absorbing sheets 6 is reflected, thereby achieving selection of light. At last, only light with the incident angle of α is left, and light with other incident angles is absorbed by the first light-absorbing sheets, thereby achieving selection for the target light.

A collimation degree φ and a collimation efficiency η of the light source can be determined according to the two following formulas:

$$\varphi = \arctan\frac{L}{(H/\sin\alpha)*(n+1)} \quad (n=0,1,2\ldots),$$

$$\eta = 1\bigg/\left(1+\frac{2*H}{L}*\tan\alpha*(n+1)\right) \quad (n=0,1,2\ldots),$$

where H is a thickness of the glass substrate, L is the width of the light inlet 7, α is an incident angle, and n is the number of transmissions of light within the glass substrate.

Figure 3:
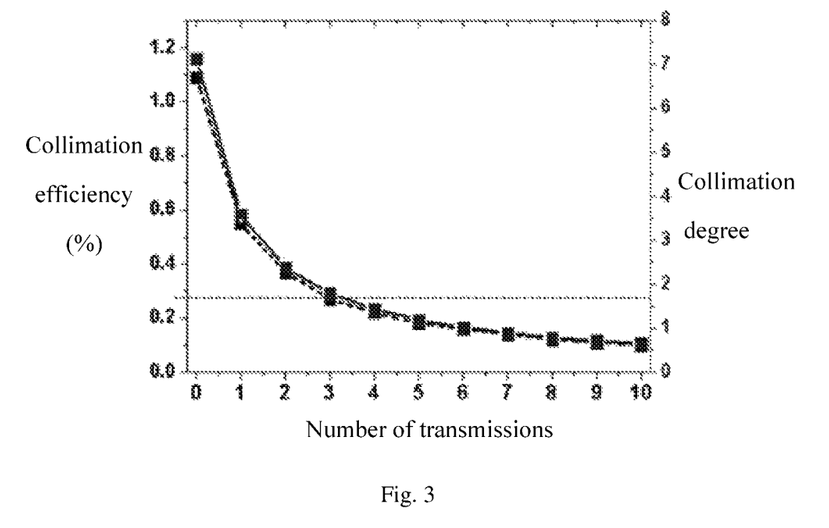
FIG. 3 is a graph showing a degree of collimation and a collimation efficiency varying with the number of transmissions in collimation with a first light-shielding layer in a spectrum detection apparatus according to an embodiment of the present disclosure, the solid line representing a relation between the degree of collimation and the number of transmissions, and the dashed line representing a relation between the collimation efficiency and the number of transmissions.

Graphs illustrating the collimation degree and the collimation efficiency can be obtained with the two foregoing formulas and known parameters. As can be clearly seen from FIG. 3, the collimation degree is smaller than 2 degrees in a case that light undergoes 3 transmissions (reflections) within the glass substrate, and the collimation efficiency in this case is about 0.3%. According to FIG. 3, in this manner of collimation, the limit of collimation degree is 0.65 degrees and, a corresponding collimation efficiency is 0.1%. A manufacturer can select a proper number of transmissions as needed, so that the collimation degree φ and the collimation efficiency η of the light source can meet requirements of a spectrometer.

In some embodiments, in case that light with some wavelengths are not separated after the dispersed by the grating 9, a light inlet 7, a first light-absorbing sheet, a grating 9, a second grating and a light outlet 10 may be sequentially provided on the first surface of optical medium layer 16 in the optical substrate 1, where the light inlet 7, the first light-absorbing sheet, the grating 9 and the light outlet 10 are arranged in the same manner as in the foregoing embodiment, and the second grating is configured to diffract and disperse the light which has been diffracted and dispersed by the grating 9. The light can be better dispersed by performing diffractive dispersion on the light with the grating 9 and the second grating in sequence, and thus, light with different wavelengths can be better separated.

In some embodiments, with reference to FIG. 1, in order to better detect emergent light from the light outlet 10 and the micro-fluid channel 4, the photosensitive sensor 5 is arranged corresponding to the light outlet 10. Emergent light from the light outlet 10 has been separated by wavelengths, and light with different wavelengths has different diffraction angles. Thus, light with different wavelengths radiates at different locations in the light outlet 10. Each micro-fluid channel 4 may be configured to correspond to light with a different wavelength from that corresponding to other micro-fluid channels, and light with different wavelengths can be transmitted, absorbed or dispersed by micro-fluids in different micro-fluid channels 4, where characteristics of a micro-fluid in each micro-fluid channel 4 can be detected by detecting light emergent from the micro-fluid channel. In addition, each micro-fluid channel 4 may be configured to correspond to a photosensitive sensor 5, thereby achieving detection on the micro-fluid by detecting light exiting from the micro-fluid channel 4.

In some embodiments, with reference to FIG. 1, in order to further absorb light with non-target angles, third light-shielding sheets 13 are provided near the light outlet 10, and the number of the third light-shielding sheets 13 is at least two. One of the third light-shielding sheets 13 is located between the grating 9 and the light outlet 10, and another of the third light-shielding sheets 13 is located at a side of the light outlet 10 away from the grating 9. Each of the third light-absorbing sheets 13 is a black matrix made of a black photoresist resin thin film or a metal thin film.

In some embodiments, multiple gratings 9 are provided, and different gratings 9 are configured to perform diffraction and dispersion on light in different wavebands. For example, the light source emits white light, and when splitting the white light, light with different wavelengths in the white light can be dispersed with multiple gratings 9, to increase a difference between diffraction angles of light with two adjacent wavelengths in each waveband, so that light with different wavelengths can more precisely correspond to respective micro-fluid channels 4 and photosensitive sensors 5.

In some embodiments, the spectrum detection apparatus includes multiple light sources, and light inlets 7, first light-shielding layers, gratings 9 and light outlets 10, the number of each of which is the same as the number of the light sources, are arranged on the first surface of the optical medium layer 16 of the optical substrate 1. One light inlet 7, one first light-shielding layer, one grating 9 and one light outlet 10 which are sequentially arranged constitute a group, and each group is arranged in the same manner as in the foregoing embodiments. All groups may be located within one row or one column, or evenly distributed on the first surface of the optical medium layer 16. A light inlet 7 of each group corresponds to a light source, and gratings 9 in different groups are configured to perform diffractive dispersion on light in different wavebands, where light with different wavelengths in the dispersed light has different diffraction angles. At least one photosensitive sensor 5 in each group corresponds to light with different wavelengths at light outlet 10, and each of at least one micro-fluid channel 4 in each group is located between the light outlet 10 and a photosensitive sensor 5, where the at least one micro-fluid channel 4 is in one-to-one correspondence with the at least one photosensitive sensor 5.

According to the diffraction grating equation, $n_i*\sin\Theta_1 - n_d*\sin\Theta_d = m*\lambda/\Lambda$ ($m=0, +/-1, 2, \ldots$), where $n_i$ and $\Theta_i$ are respectively a refractive index of an incident medium and an incident angle, m is a diffraction order, $\Lambda$ is a period of a grating, $\lambda$ is a wavelength of incident light, $\Theta_d$ is an included angle between a diffraction light direction and a normal line of a panel plane, and $\Theta_d$ is an equivalent refractive index of the glass substrate to air. The grating 9 can perform transmissive dispersion on incident white light. In order to reduce or avoid crosstalk between dispersions of different orders, it is preferred that light with each wavelength only has one order of diffraction after passing through the grating 9, and different diffraction orders have different diffraction angles, and in this way, white light can be split. However, it is difficult that light with each wavelength in the white light has only one order of diffraction with only one grating 9. Therefore, multiple gratings 9 are used to perform diffractive dispersion on different wavebands of the white light.

The spectrum detection apparatus can perform diffractive dispersion on multiple wavebands of white light, where a grating 9 in each group corresponds one waveband of the white light and perform dispersion on light in the waveband. The difference between diffraction angles of light with two adjacent wavelengths in each waveband is enlarged as much as possible, to separate light within each waveband, so that each wavelength corresponds to one micro-fluid channel 4 and further corresponds to one photosensitive sensor 5 to thereby detect spectral properties of the micro-fluid. Without giving considerations into a size of the photosensitive sensor 5, volumes of the micro-fluid channel 4 and the micro-fluid can be small enough, and in this case, a dispersion precision according to the present disclosure can be made smaller than 1 nm, thereby achieving ultrahigh resolutions.

In an embodiment, the thickness of the glass substrate is 2 mm, dimensions of the Micro-LED chip are 250 um*250 um*100 um, color separation can be performed on light in the waveband of 380 nm to 570 nm by a grating 9 with a grating period of 380 nm. The dispersed light with first-order diffraction angles is incident on the second surface of the glass substrate with incident angles greater than the critical angle of the glass substrate to air. Light with incident angles smaller than the critical angle of the glass substrate to air directly transmits out of the glass substrate through the second surface, and diffraction light with incident angles greater than the angle of total reflection is reflected to the first surface of the glass substrate by the second surface of the glass substrate, thereby increasing spacings between dispersed light with different wavelengths and facilitating matching between the micro-fluid channel 4 and the photosensitive sensor 5.

Figure 4:
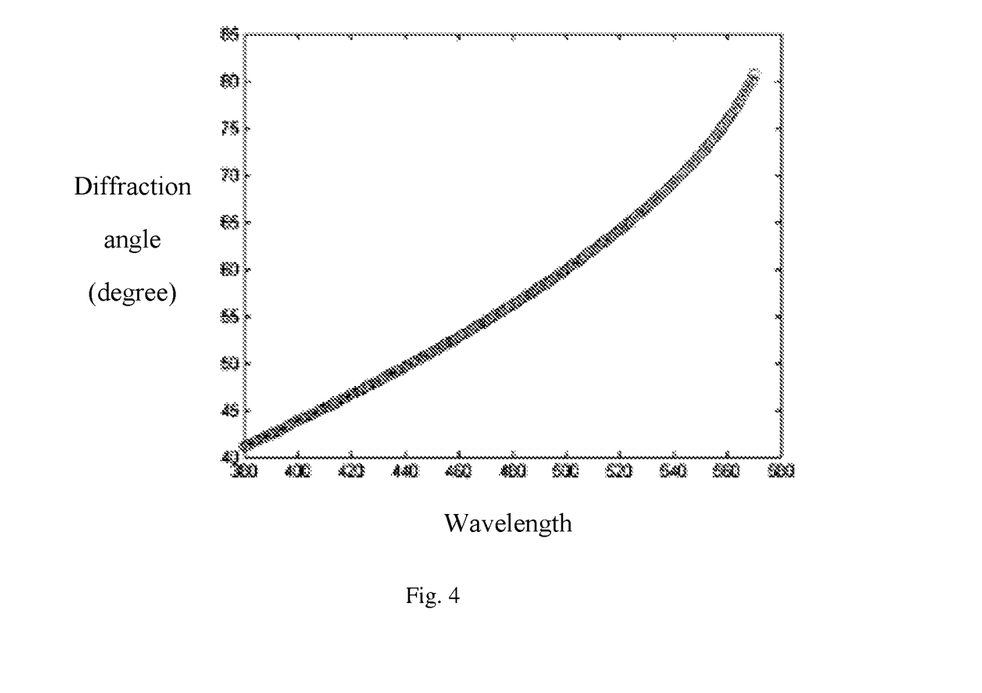
FIG. 4 is a graph showing diffraction angles of first-order diffraction of light with wavelengths ranging from 380 nm to 570 nm after diffracted by a grating with a grating period of 380 nm in a spectrum detection apparatus according to an embodiment of the present disclosure.
Figure 5:
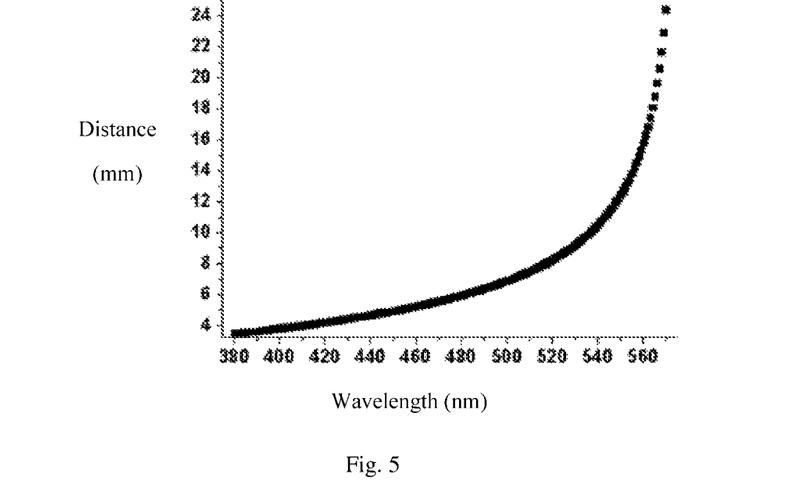
FIG. 5 is a graph showing distances between a light source and light with wavelengths ranging from 380 nm to 570 nm after diffracted by a grating with a grating period of 380 nm in a spectrum detection apparatus according to an embodiment of the present disclosure.

After dispersed by the grating 9 with a grating period of 380 nm, light in the waveband of 380 nm to 570 nm is sequentially distributed at the light outlet 10 with the angels shown in FIG. 4 and the distances shown in FIG. 5 by the 2 mm thick glass substrate. Photoresist with a refractive index equal to a refractive index of glass is provided on the first surface of the glass substrate, and micro-fluid channels 4 are formed by etching the photoresist. In a case that liquids or gases with other refractive indexes flow in the micro-fluid channels 4, the total reflection condition of the micro-fluid channels 4 does not satisfy, and monochromatic lights enter respective micro-fluid channels 4 after exiting from the glass substrate, and react physically or chemically with the micro-fluids, where signals respectively generated are detected by photosensitive sensors 5 in one-to-one correspondence with the micro-fluid channels 4. Light with wavelengths greater than 570 nm cannot be diffracted by the grating 9 with a grating period of 380 nm, and thus transmits out of the glass substrate through the second surface thereof, thereby having no influence on color separation intended for selection of light with target wavelengths.

Figure 6:
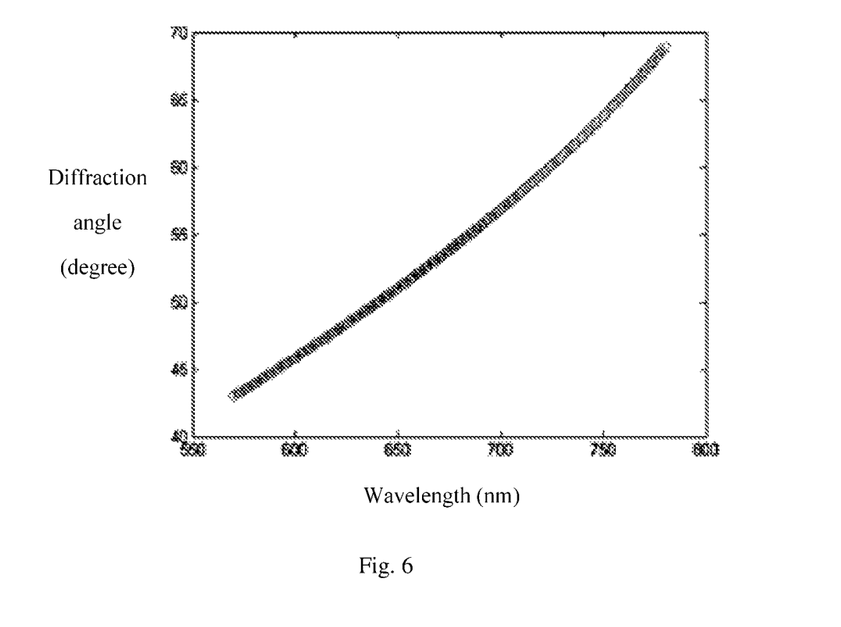
FIG. 6 is a graph showing diffraction angles of first-order diffraction of light with wavelengths ranging from 571 nm to 780 nm after diffracted by a grating with a grating period of 550 nm in a spectrum detection apparatus according to an embodiment of the present disclosure.
Figure 7:
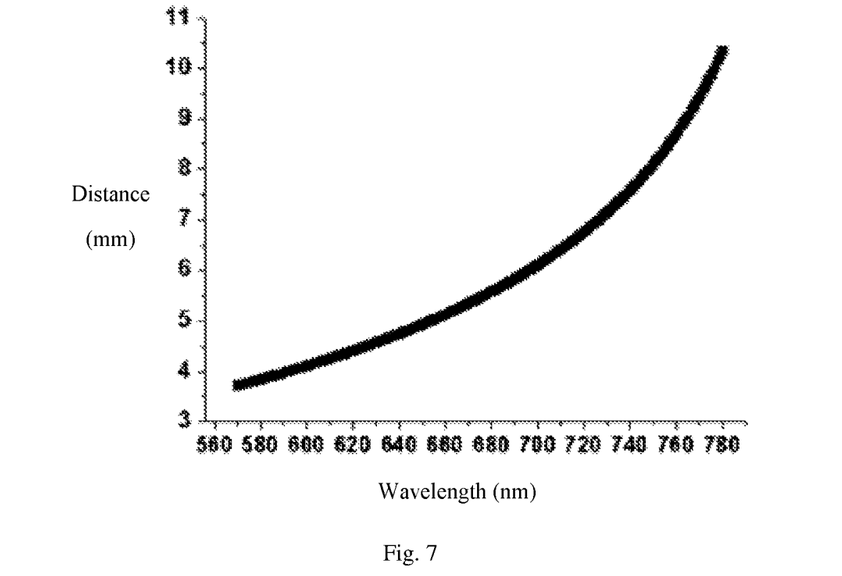
FIG. 7 is a graph showing distances between a light source and light with wavelengths ranging from 571 nm to 780 nm after diffracted by a grating with a grating period of 550 nm in a spectrum detection apparatus according to an embodiment of the present disclosure.
Figure 8:
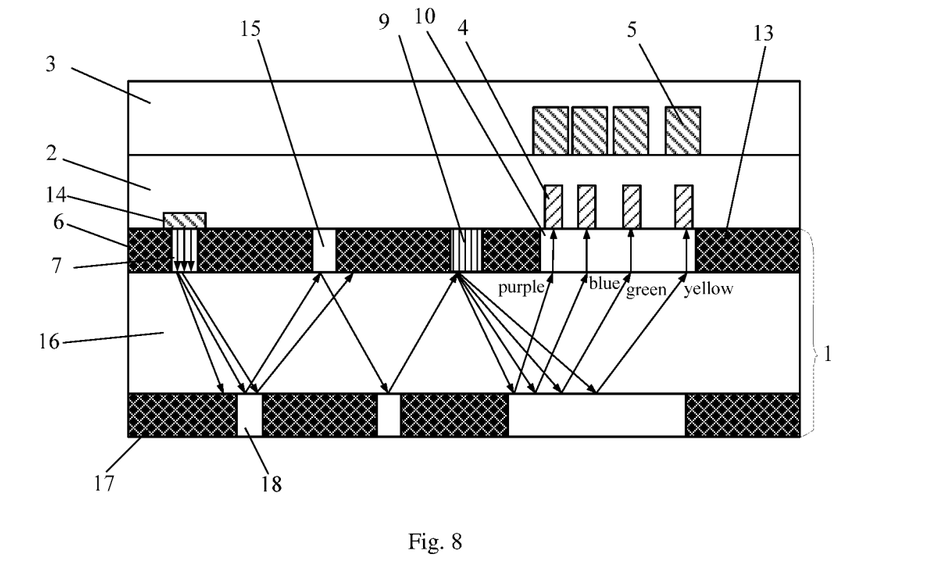
FIG. 8 is a schematic diagram of a spectrum detection apparatus according to an embodiment of the present disclosure.

Similarly, light in the waveband of 571 nm to 780 nm can be dispersed by a grating 9 with a grating period of 550 nm. After dispersed by the grating 9 with the grating period of 550 nm, light in the waveband of 571 nm to 780 nm is sequentially distributed at the light outlet 10 with the angels shown in FIG. 6 and the distances shown in FIG. 7 by the 2 mm thick glass substrate. Light with wavelengths smaller than 570 nm has diffraction angles smaller than the angle of total reflection, and thus directly transmits out of the glass substrate through the second surface thereof, thereby having no influence on the color separation.

Figure 9:
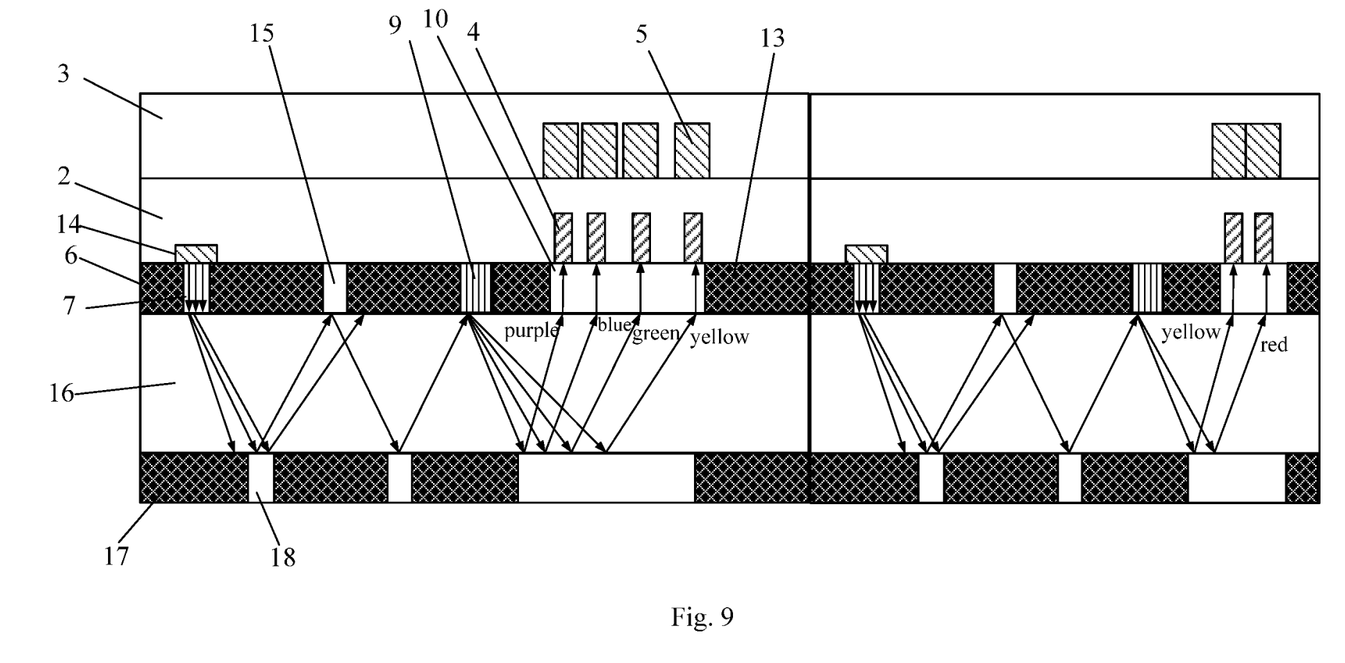
FIG. 9 is a schematic diagram of a spectrum detection apparatus according to an embodiment of the present disclosure.

FIG. 9 is a schematic diagram of a spectrum detection apparatus according to an embodiment of the present disclosure. As shown in FIG. 9, the spectrum detection apparatus includes two optical substrates 1, and periods of two gratings in the two optical substrates 1 are 380 nm and 550 nm, respectively. A spectrum of light in the waveband of 380 nm to 570 nm generated at a first optical substrate includes purple light, blue light, green light and yellow light distributed in sequence in a direction from the light inlet to the light outlet, and a spectrum of light in the waveband of 571 nm to 780 nm generated at a second optical substrate includes yellow light and green light distributed in sequence in a direction from the light inlet to the light outlet, where light with different wavelengths are received by different sensors.

In the embodiment, the optical medium layer is made of glass with a refractive index of 1.52 and a thickness of 2 mm, and the first and the second medium layers are both air layers. A width of the diffraction spectrum generated at the first optical substrate is 24 mm, and a width of the diffraction spectrum generated at the second optical substrate is 11 mm. Thus, dispersed light in different wavelengths is distinguished precisely.

The spectrum detection apparatus according to the present disclosure has the following technical benefits. It has a simple structure and a low manufacture difficulty. The light inlet, the first light-shielding layer, the grating and the light outlet on the first surface of the optical medium layer can achieve selection and dispersion on the light emitted by the light source, and the selected and dispersed light transmits out of the optical medium layer through the light outlet, thereby achieving precise spectroscopic color separation. The light exiting from the light outlet passes through the micro-fluid channel, and the photosensitive sensor detects the spectral response properties of the micro-fluid flowing in the micro-fluid channel by detecting the emergent light from the micro-fluid channel.

Unless otherwise defined, technical terms or scientific terms used in the present disclosure should be interpreted according to common meanings thereof as commonly understood by those of ordinary skills in the art. Such terms as "first", "second" and the like used in the present disclosure do not represent any order, quantity or importance, but are merely used to distinguish different components. Such terms as "including", or "comprising" and the like mean that an element or an article preceding the term contains elements or items and equivalents thereof behind the term, but does not exclude other elements or items. Such terms as "connected", or "interconnected" and the like are not limited to physical or mechanical connections, but may include electrical connections, whether direct connection or indirect connection. Such terms as "on", "under", "left", "right" and the like are only used to represent a relative position relationship, and when an absolute position of a described object is changed, the relative position relationship thereof may also be changed accordingly.

It may be understood that when an element such as a layer, a film, a region or a substrate is referred to as being "on" or "under" another element, the element may be "directly" "on" or "under" the another element, or there may exist an intervening element.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A spectrum detection apparatus, comprising at least one spectrum detection unit, wherein each of the at least one spectrum detection unit comprises:
    a light source, configured to emit light;
    an optical substrate, comprising an optical medium layer, wherein the optical medium layer comprises a first surface and a second surface opposite to the first surface, the first surface is closer to the light source than the second surface, and a refractive index of the optical medium layer is higher than 1, and wherein the optical substrate further comprises a light inlet, a first light-shielding layer, a grating and a light outlet sequentially arranged on the first surface and in an extension direction of the optical medium layer, the light inlet is arranged corresponding to the light source and is configured to guide the light emitted by the light source into the optical medium layer under the light inlet, the first light-shielding layer is configured to reflect target light and absorb non-target light, and the grating is configured to perform diffractive dispersion on the target light;
    a micro-fluid substrate, arranged on a side of the optical substrate proximate to the light source and comprising at least one micro-fluid channel configured to accommodate a micro-fluid, wherein the light outlet is configured to guide light dispersed by the grating and thereafter reflected by the second surface into the at least one micro-fluid channel; and
    a sensor substrate, arranged at a side of the micro-fluid substrate facing away from the optical substrate, and comprising at least one photosensitive sensor that is configured to detect light exiting from the at least one micro-fluid channel.

2. The apparatus according to claim 1, wherein the first light-shielding layer comprises a plurality of first light-absorbing sheets and a plurality of first medium layers that are arranged alternately in the extension direction of the optical medium layer, and wherein each of the first light-absorbing sheets is configured to absorb light with a non-target incident angle, and a refractive index of the first medium layer is lower than the refractive index of the optical medium layer, whereby light with a target angle is totally reflected by an interface between the first medium layer and the optical medium layer.

3. The apparatus according to claim 2, wherein a length of each light-absorbing sheet is 2*tan α*H–L, where α is a principal incident angle of the light emitted by the light source and is greater than an angle of total reflection, H is a thickness of the optical medium layer, and L is a width of the light inlet.

4. The apparatus according to claim 3, wherein a length of each first medium layer is smaller than or equal to the width L of the light inlet.

5. The apparatus according to claim 3, wherein the principal incident angle α is selected from angles between a critical angle of the optical medium layer to air and 60 degrees.

6. The apparatus according to claim 1, wherein each spectrum detection unit comprises a plurality of gratings; or
    grating constants of gratings in different spectrum detection units are different, and gratings in different spectrum detection units are configured to perform diffractive dispersion on light in different wavebands, respectively.

7. The apparatus according to claim 1, wherein the at least one photosensitive sensor is arranged corresponding to the light outlet.

8. The apparatus according to claim 3, wherein a second light-shielding layer is provided on the second surface of the optical medium layer, and the second light-shielding layer comprises a plurality of second light-absorbing sheets and a plurality of second medium layers that are arranged alternately in an extension direction of the optical medium layer,
    wherein a length of each second light-absorbing sheet is equal to the length of the first light-absorbing sheet, a length of each second medium layer is equal to a length of the first medium layer, and each of the first light-absorbing sheets and the corresponding first light-absorbing sheet are misaligned with each other by a first distance in a direction from the light inlet to the light outlet, whereby light reflected by each second medium layer is incident on the corresponding first medium layer.

9. The apparatus according to claim 1, wherein the optical substrate further comprises a plurality of third light-absorbing sheets arranged on the first surface and configured to absorb the dispersed light that is not guided into the light outlet, wherein a first part of the third light-shielding sheets is located between the grating and the light outlet, and a second part of the third light-shielding sheets is located at a side of the light outlet away from the grating.

10. The apparatus according to claim 1, wherein the optical medium layer is made of at least one of glass, a resin, a polyester compound, or paper.

11. The apparatus according to claim 1, wherein the micro-fluid substrate further comprises:
    a reaction cell connected with one end of the at least one micro-fluid channel; and
    a waste reservoir connected with the other end of the at least one micro-fluid channel.

12. The apparatus according to claim 11, wherein each reaction cell is connected with at least one micro-fluid channel.

13. The apparatus according to claim 2, wherein the first light-absorbing sheet comprises a black photoresist resin thin film or a metal thin film, and the first medium layer is an air layer.

14. The apparatus according to claim 8, wherein the second light-absorbing sheet comprises a black photoresist resin thin film or a metal thin film, and the second medium layer is an air layer.

15. The apparatus according to claim 1, wherein the at least one micro-fluid channel is formed by spin-coating photoresist on the optical substrate and exposing the photoresist as spin-coated.

16. The apparatus according to claim 1, wherein the light source is a micro light-emitting diode.

17. The apparatus according to claim 1, wherein the at least one photosensitive sensor is integrated into the sensor substrate by using a transparent electrode.

18. The apparatus according to claim 1, wherein a hydrophobic film layer or a hydrophilic film layer is applied on an inner surface of each micro-fluid channel, whereby the micro-fluid flows at a predetermined velocity or holds still for a short time in the micro-fluid channel.

19. The apparatus according to claim 2, wherein the first light-absorbing sheet is further configured to absorb light with a non-target wavelength, and the optical substrate, the micro-fluid substrate and the sensor substrate are stacked in sequence.

20. The apparatus according to claim 8, wherein the first distance is a half of a sum of lengths of the first light-absorbing sheet and the first medium layer.

* * * * *